(12) United States Patent
Khazen et al.

(10) Patent No.: US 9,831,614 B2
(45) Date of Patent: Nov. 28, 2017

(54) TRANSCEIVER RECEPTACLE CAGE

(71) Applicant: Mellanox Technologies Ltd., Yokneam (IL)

(72) Inventors: Nimer Khazen, Ba'ne (IL); Rafi Lagziel, Modiin (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 283 days.

(21) Appl. No.: 14/684,527

(22) Filed: Apr. 13, 2015

(65) Prior Publication Data
US 2015/0214686 A1    Jul. 30, 2015

Related U.S. Application Data

(62) Division of application No. 14/191,550, filed on Feb. 27, 2014, now Pat. No. 9,112,314.

(60) Provisional application No. 61/771,103, filed on Mar. 1, 2013.

(51) Int. Cl.
| | |
|---|---|
| H01R 13/6594 | (2011.01) |
| H01R 13/658 | (2011.01) |
| H01R 13/6582 | (2011.01) |
| G02B 6/42 | (2006.01) |
| H01R 43/20 | (2006.01) |
| H01R 13/518 | (2006.01) |

(52) U.S. Cl.
CPC ....... *H01R 13/6594* (2013.01); *G02B 6/4246* (2013.01); *G02B 6/4261* (2013.01); *G02B 6/4277* (2013.01); *H01R 13/6582* (2013.01); *H01R 13/65802* (2013.01); *H01R 43/205* (2013.01); *H01R 13/518* (2013.01); *Y10T 29/49826* (2015.01); *Y10T 29/49876* (2015.01); *Y10T 29/49922* (2015.01)

(58) Field of Classification Search
CPC ............ H01R 13/518; H01R 13/65802; H01R 13/6582; H01R 13/6594; H01R 43/205; G02B 6/4246; G02B 6/4261; G02B 6/4277; Y10T 29/49826; Y10T 29/49876; Y10T 29/49922
See application file for complete search history.

(56) References Cited

U.S. PATENT DOCUMENTS

| | | | | |
|---|---|---|---|---|
| 6,368,153 B1 * | 4/2002 | Hwang | ............ | H01R 13/65802 439/353 |
| 6,478,622 B1 * | 11/2002 | Hwang | ............ | H01R 13/65802 385/92 |
| 7,455,554 B2 * | 11/2008 | Long | ............... | G02B 6/4201 439/607.17 |
| 9,391,407 B1 * | 7/2016 | Bucher | ............... | G02B 6/4201 |

(Continued)

*Primary Examiner* — Christopher M Koehler
(74) *Attorney, Agent, or Firm* — D.Kligler IP Services Ltd.

(57) ABSTRACT

A connector cage includes a bezel, having a plurality of slots formed therein, and a cage structure including upper and lower sides and multiple partitions extending between the upper and lower sides to define receptacles for receiving cable connectors. Multiple tabs protrude out of at least one of the sides in locations at which the tabs fit into the slots in the bezel, and are folded over the slots so as to secure the cage structure to the bezel. The cage may also include multiple snap-on spring subassemblies, each spring subassembly secured to a front end of a respective partition and comprising leaves that bow outward to contact the shells of the connectors that are inserted into the receptacles adjacent to the partition.

10 Claims, 7 Drawing Sheets

(56) References Cited

U.S. PATENT DOCUMENTS

| | | | | |
|---|---|---|---|---|
| 9,407,046 B1* | 8/2016 | Bucher | ............... | H01R 13/659 |
| 2006/0245759 A1* | 11/2006 | Kurashima | .......... | G02B 6/4201 |
| | | | | 398/138 |
| 2008/0299826 A1* | 12/2008 | Cheng | ................ | H01R 23/6873 |
| | | | | 439/607.01 |
| 2010/0151733 A1* | 6/2010 | Tsou | ................. | H01R 23/6873 |
| | | | | 439/607.55 |
| 2013/0186681 A1* | 7/2013 | Wickes | ............... | H05K 9/0009 |
| | | | | 174/382 |
| 2013/0277086 A1* | 10/2013 | Rohmer | .................. | H05K 5/02 |
| | | | | 174/51 |
| 2013/0284682 A1* | 10/2013 | Rohrer | ............... | H05K 7/1425 |
| | | | | 211/26.2 |

* cited by examiner

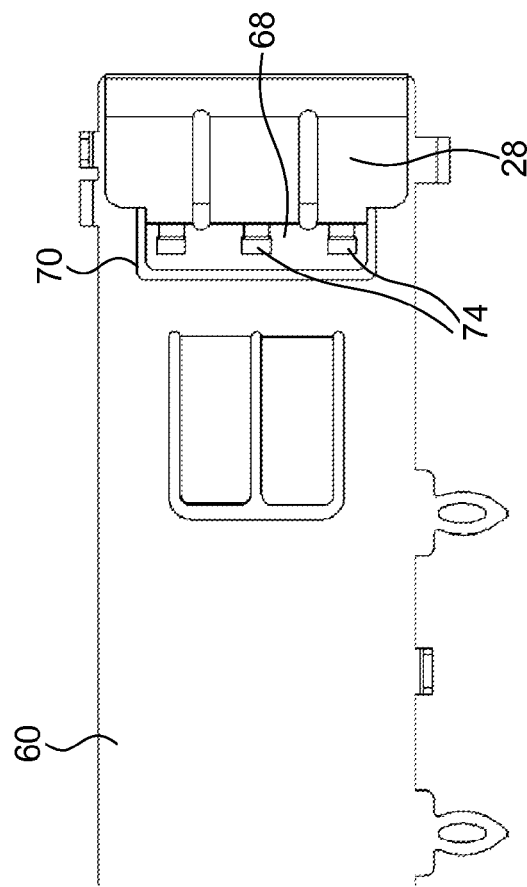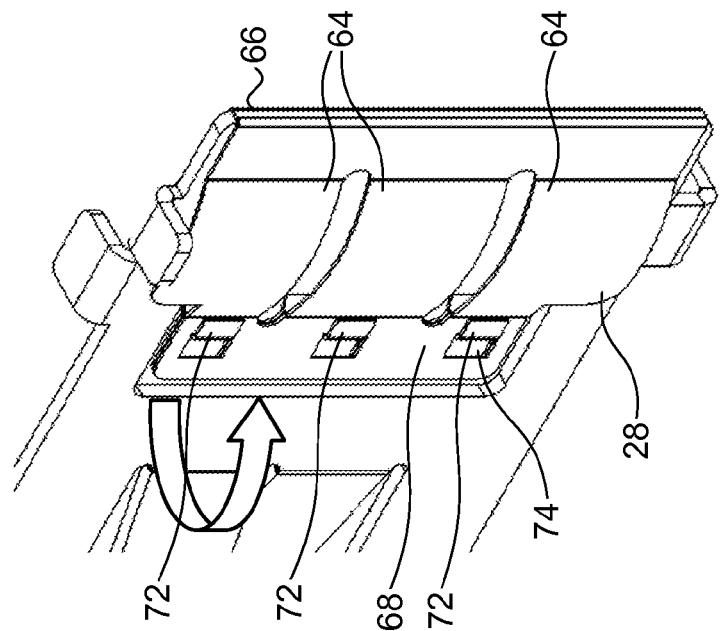

TRANSCEIVER RECEPTACLE CAGE

CROSS-REFERENCE TO RELATED APPLICATION

This application is a division of U.S. patent application Ser. No. 14/191,550, filed Feb. 27, 2014, which claims the benefit of U.S. Provisional Patent Application 61/771,103, filed Mar. 1, 2013, which is incorporated herein by reference.

FIELD OF THE INVENTION

The present invention relates generally to connection hardware for data communications, and specifically to panel receptacles for cable connectors.

BACKGROUND

Small Form-factor Pluggable (SFP) modules are used in a wide range of telecommunication and data networking applications to interface between a printed circuit board in a piece of network equipment and a network cable (which may be electrical or fiberoptic). Typically, the SFP receptacle is mounted on the printed circuit board with appropriate electrical connections to the circuit traces on the board, and a connector at the end of the cable plugs into the receptacle. The connector itself commonly contains signal conversion circuitry and is therefore referred to as a "transceiver."

QSFP (Quad Small Form-factor Pluggable) I/O connectors are commonly used for high-speed data interconnections. The QSFP interconnect system can support transfer at data rates up to 40 Gb/s (4×10) and 56 Gb/s (4×14). QSFP interconnects provide high port density and enable users to make better use of available linear printed circuit board (PCB) space. The QSFP interconnect specifications (such as SFF-8662, for example, for 4×14 Gb/s operation) define a 38-position connector, a receptacle cage, and copper and/or optical cable assemblies, which together increase linear board port signal density well above previous SFP standards.

This system is particularly well suited for transaction-intense networks that are typically deployed in data centers and high-performance computing applications.

SUMMARY

Embodiments of the present invention that are described hereinbelow provide improved panel receptacles for cable connectors.

There is therefore provided, in accordance with an embodiment of the present invention, a connector cage, which includes a bezel, having a plurality of slots formed therein, and a cage structure including upper and lower sides. Multiple partitions extend between the upper and lower sides to define receptacles for receiving cable connectors. Multiple tabs protrude out of at least one of the sides in locations at which the tabs fit into the slots in the bezel, and are folded over the slots so as to secure the cage structure to the bezel.

The tabs may be formed as a part of the partitions, and the bezel may have indentations adjacent to the slots, such that the tabs fold into the indentations.

There is also provided, in accordance with an embodiment of the present invention, a connector cage, which includes an upper side, a lower side, which is configured to be mounted on a printed circuit board (PCB), and multiple partitions extending between the upper and lower sides to define receptacles for receiving cable connectors having respective shells that fit into the receptacles. An edge of the lower side is cut and formed to define multiple spring leaves, including first leaves that bend upward into the receptacles to engage the shells of the connectors and second leaves that bend downward to engage the PCB.

There is additionally provided, in accordance with an embodiment of the present invention, a connector cage, which includes an upper side, a lower side, multiple partitions extending between the upper and lower sides to define receptacles for receiving cable connectors having respective shells that fit into the receptacles, and multiple snap-on spring subassemblies. Each spring subassembly is secured to a front end of a respective partition and including leaves that bow outward to contact the shells of the connectors that are inserted into the receptacles adjacent to the partition.

In disclosed embodiments, each spring subassembly has a central fold, which fits over the front end of the respective partition, and includes first and second leaves, disposed respectively on opposing, first and second sides of the fold so as to bow outward into the receptacles on the opposing sides of the respective partition, and fastening elements, which extend rearward from the leaves, pass through an opening in the partition, and are then folded over so as to secure the spring subassembly to the partition.

In one embodiment, the fastening elements include tabs extending rearward from the first leaves, and the spring subassembly includes a plate, which extends rearward from the second leaves and which contains one or more slots and fits within the opening in the partition, and wherein the tabs fit into the slots in the plate and are folded over the plate to secure the spring subassembly to the partition.

In another embodiment, the opening in the partition includes multiple slots, and the fastening elements includes first and second tabs, which extend rearward from the first and second leaves, respectively and are fit into the slots from the opposing sides of the respective partition and are folded over the partition to secure the spring subassembly in place.

There is further provided, in accordance with an embodiment of the present invention, a method for production of a connector cage. The method includes providing a cage structure including upper and lower sides and multiple partitions extending between the upper and lower sides to define receptacles for receiving cable connectors. A bezel is connected to the cage structure by fitting multiple tabs, which protrude out of at least one of the sides of the cage structure, into slots in the bezel, and folding the tabs over the slots.

There is moreover provided, in accordance with an embodiment of the present invention, a method for production of a connector cage for mounting on a printed circuit board (PCB). The method includes providing a cage structure including upper and lower sides and multiple partitions extending between the upper and lower sides to define receptacles for receiving cable connectors having respective shells that fit into the receptacles. An edge of the lower side is cut and formed to define multiple spring leaves, including first leaves that bend upward into the receptacles to engage the shells of the connectors and second leaves that bend downward to engage the PCB.

There is furthermore provided, in accordance with an embodiment of the present invention, a method for production of a connector cage. The method includes providing a cage structure including upper and lower sides and multiple partitions extending between the upper and lower sides to define receptacles for receiving cable connectors having respective shells that fit into the receptacles. A respective spring assembly is snapped onto a front end of each partition. The spring subassembly includes leaves that bow outward to contact the shells of the connectors that are inserted into the receptacles adjacent to the partition.

In some embodiments, the respective spring subassembly is snapped onto each partition by passing fastening elements, which extend rearward from the leaves, through an opening in the partition, and folding the fastening elements over through the opening so as to secure the spring subassembly to the partition.

The present invention will be more fully understood from the following detailed description of the embodiments thereof, taken together with the drawings in which:

BRIEF DESCRIPTION OF THE DRAWINGS

FIGS. 8A and 8B are schematic detail views of the partition of FIG. 7, illustrating a snap-on spring subassembly attached to the front end of the partition;

DETAILED DESCRIPTION OF EMBODIMENTS

Figure 1:
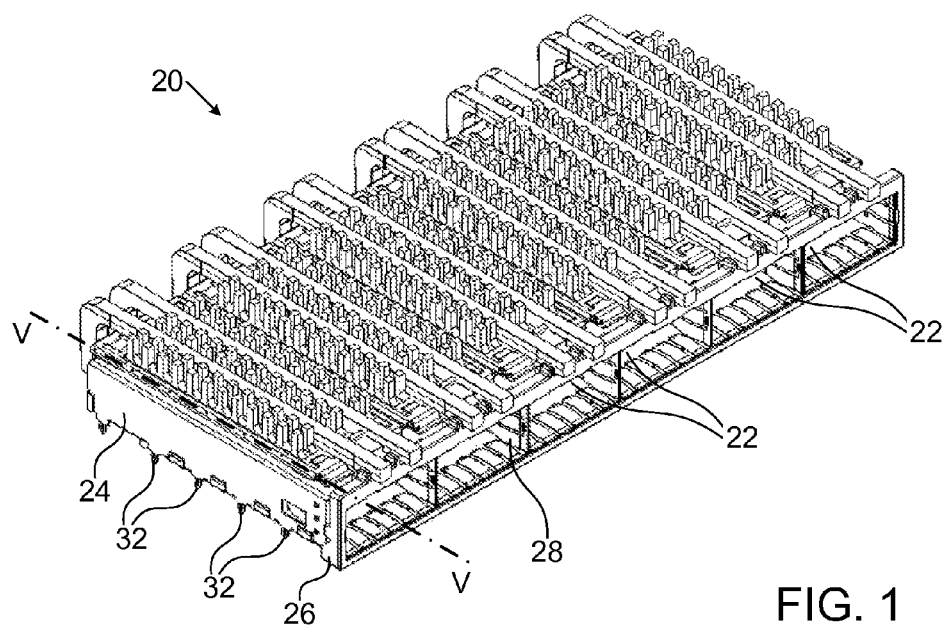
FIG. 1 is a schematic, pictorial illustration of a multi-receptacle cage, in accordance with an embodiment of the present invention.

One of the challenges in realizing the potential advantages of QSFP interconnect systems is to create receptacles that are capable of meeting the mechanical and electrical requirements of the QSFP specification reliably and at reasonable cost. The receptacles must provide sufficient electrical shielding to maintain acceptable levels of electromagnetic interference (EMI) by and to the high-speed electrical signals carried between the cable connectors and the PCB. The requisite level of shielding must be maintained over many cycles of cable connection and disconnection (and any loss of shielding has a direct negative impact on receptacle lifetime and durability). These objectives should be met while minimizing the space between adjacent receptacles in a multi-receptacle cage.

In response to these needs, embodiments of the present invention that are described herein provide QSFP cage structures that are simple to assemble while at the same time maintaining strong EMI shielding and high mechanical reliability. In one embodiment, a modular front bezel for a QSFP cage is attached firmly to the cage structure by snap-in connections, without the need for welding or riveting. In other embodiments, spring contacts are provided to enable smooth insertion and removal of a connector, with good electrical contact between the grounds on the connector shell, the cage, and the PCB on which the cage is mounted. One of the spring contacts that is described hereinbelow is formed integrally as a part of the cage structure, while another is implemented as a snap-on subassembly with a secure clasp that prevents accidental detachment (again, without requiring welding or rivets).

The disclosed designs have advantages of modular assembly, manufacturability and design to cost. They requires fewer assembly stations to manufacture than comparable products. Because no welding is involved in the assembly, the disclosed designs are less costly to manufacture, requires no skilled labor on the assembly line, and yield a more consistent product, since thermal distortion that can result from welding is entirely absent. At the same time, the high quality of the spring contacts in the embodiments described below has a positive impact on the lifetime and durability of the cage. Elements of the disclosed design can be used, with little or no modification, in 1×1, 1×3, 1×4 and even future 1×12 cages.

The above features are shown and described hereinbelow with reference to a six-receptacle QSFP case. Although this cage implements all of these features of in a single cage, in alternative embodiments (not shown in the figures), one or two of these features may be implemented independently of the other features. Furthermore, although the disclosed embodiments relate specifically to QSFP interconnect systems, the principles of the present invention may similarly be implemented, mutatis mutandis, in receptacle cages of other sorts, in accordance with both QSFP and other SFP standards, as well as substantially any other applicable standard that is known in the art.

FIG. 1 schematically illustrates a QSFP cage 20, containing six receptacles 22 for QSFP cable connectors. Cage 20 comprises a cage structure 24, made from sheet metal elements, to which a molded front bezel 26 is fastened, as described hereinbelow. (A molded heat sink structure, fastened to the top of cage structure 24, is shown in the figure for completeness but is beyond the scope of the present description.) Snap-on spring subassemblies 28 are attached to the front end of partitions within cage 20. These subassemblies and other elements of the cage are shown in greater detail in the figures that follow.

Figure 10:
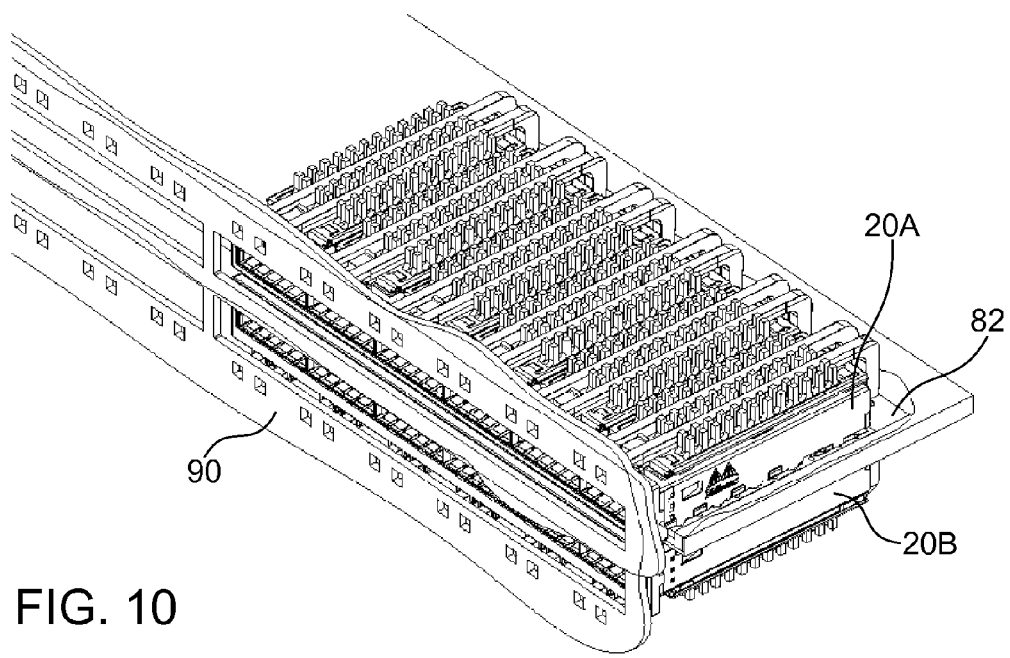
FIG. 10 is a schematic, pictorial illustration of two multi-receptacle cages mounted "belly to belly," in accordance with an embodiment of the present invention.

Cage 20 is designed to be mounted on a PCB, with pins 32 fitting into corresponding holes in the PCB (not shown). The cage may be attached to the PCB either by press-fit or soldering. Press-fit is suitable for all types of PCB, of substantially any thickness, and can also be used to fit two cages together "belly to belly," as shown in FIG. 10. Soldering is particularly suitable for mounting cage 20 on thin PCBs.

In the description that follows, the side of the cage that rests against the PCB is referred to as the bottom or lower side, while the opposite side of the PCB is referred to as the top or the upper side. The side of the cage to which bezel 26 is attached (and through which cable connectors are inserted) is referred to as the front. The terms top, upper, bottom, lower, front, and back, however, are used solely for the sake of convenience, to designate the orientation of the cage relative to the PCB and to the equipment in which the PCB is mounted. In practice, the PCB itself may be mounted in the equipment served by cage 20 in any desired orientation. Similarly, although bezel 26 typically fits into a corresponding opening in the front panel of the equipment, it may alternatively be placed in any other location that can be accessed for purposes of cable connection.

The elements of cage 20 may be produced by any suitable method that is known in the art. In the embodiment that is shown in the figures, bezel 26 is typically molded from a suitable metal, while the elements of cage structure 24 are punched out of sheet metal and then fitted together by insertion of tabs into corresponding slots, followed by folding over the tabs as appropriate. (The heat sinks are typically produced by extrusion.) The design of cage 20 that is shown in the figures and described below has advantages of simple, low-cost production while maintaining high reliability in the field, even when cable connectors are repeatedly inserted into and removed from the receptacles in the cage. Alternatively, other designs implementing the principles of the embodiments described herein will be apparent to those skilled in the art after reading the present description and are considered to be within the scope of the present invention.

Connection of Bezel to Cage Structure

Figure 2A:
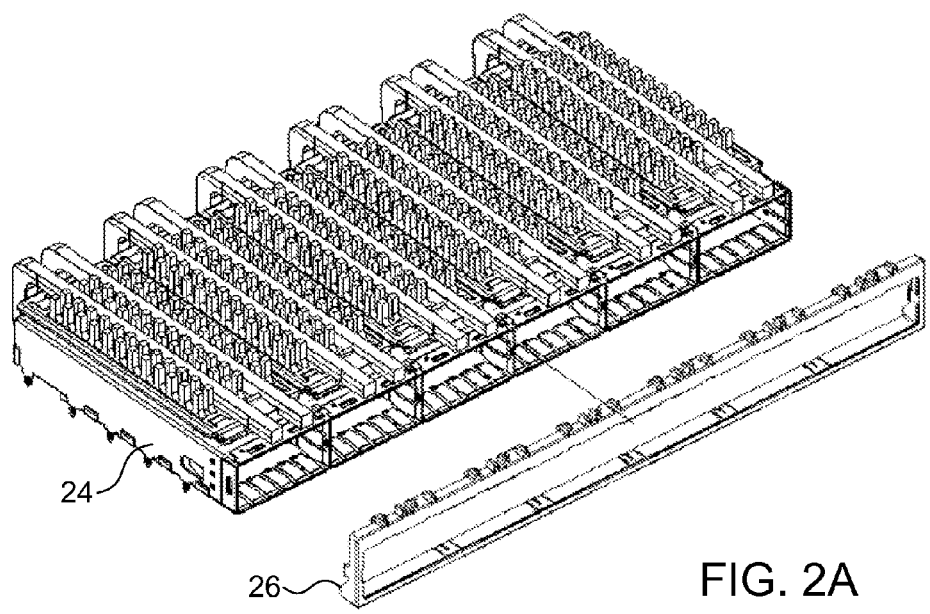
FIGS. 2A and 2B are schematic exploded views of the cage of FIG. 1, seen from above and below, respectively, showing the bezel separated from the cage structure.
Figure 2B:
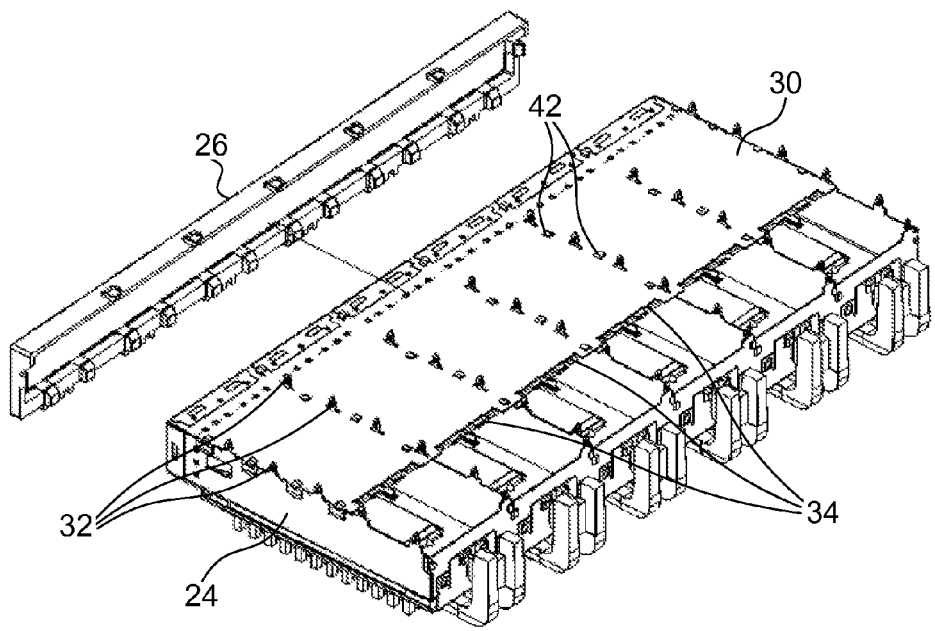
Figure 3:
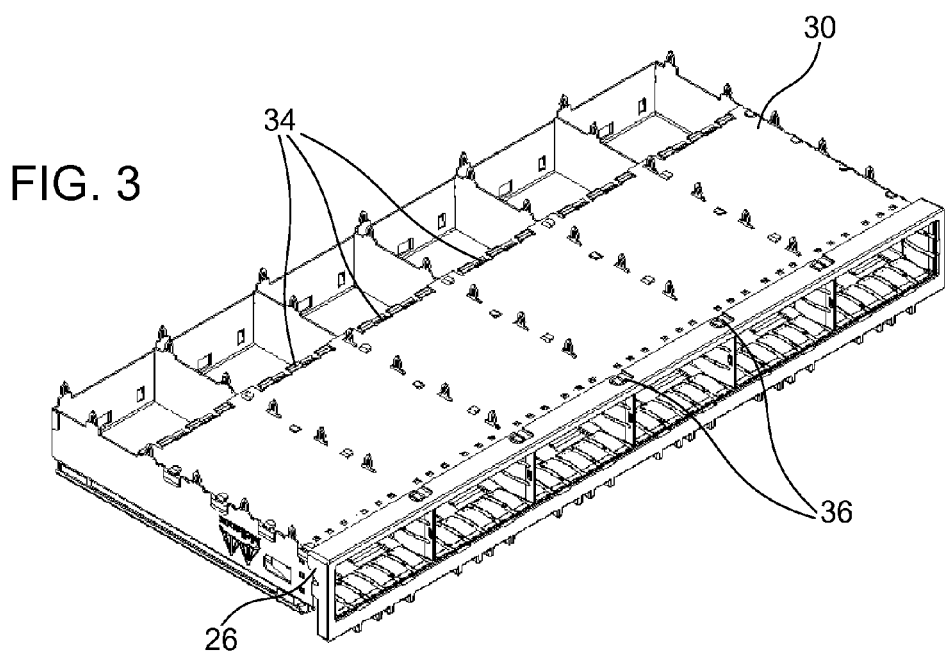
FIG. 3 is a schematic bottom view of the cage of FIG. 1, showing tab connections between the cage structure and the bezel.
Figure 4A:
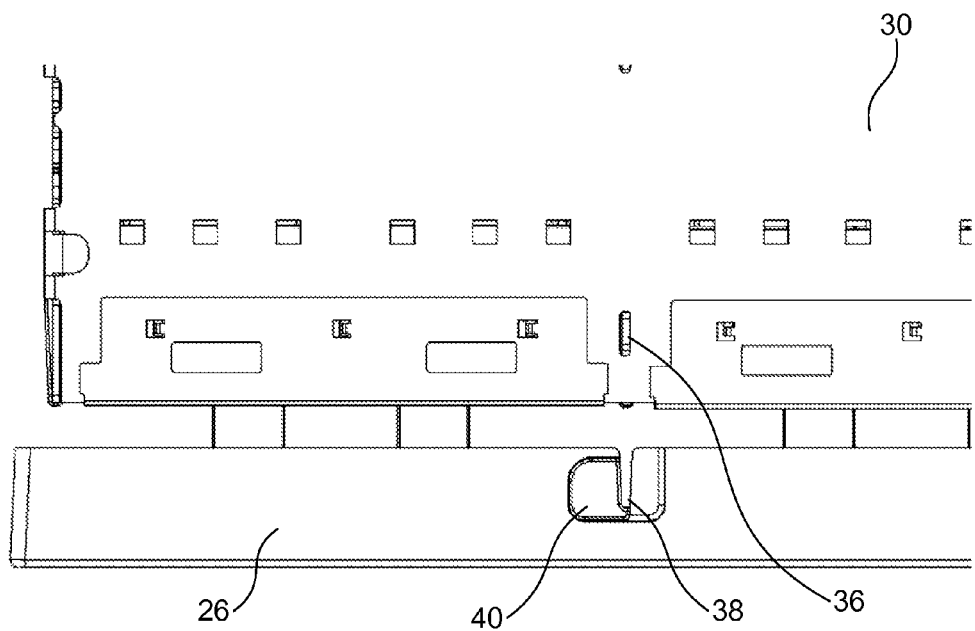
FIGS. 4A, 4B and 4C are schematic detail views of the bottom of the cage that is shown in FIG. 3, illustrating successive stages in the connection of the bezel to the cage structure.
Figure 4B:
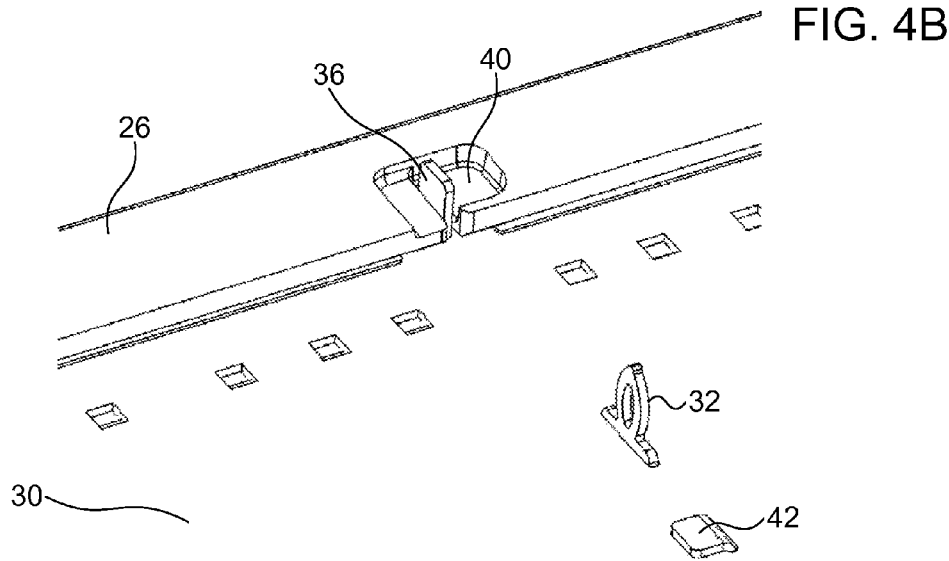
Figure 4C:
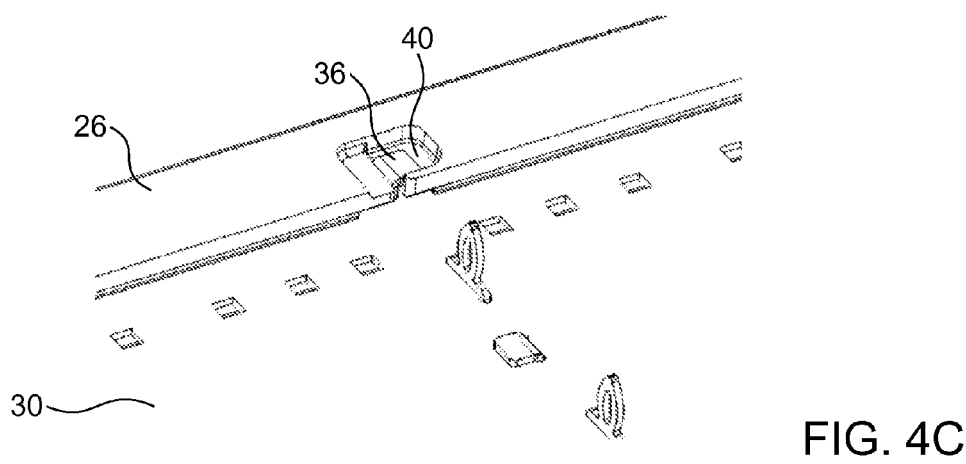
Figure 7:
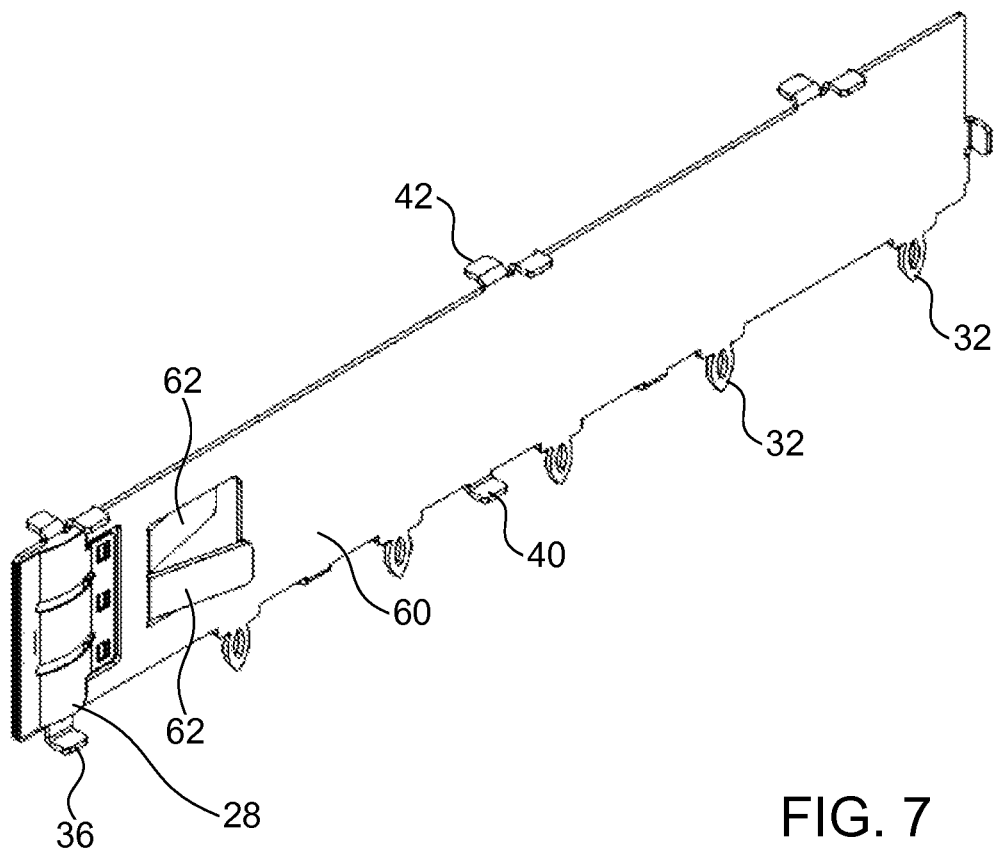
FIG. 7 is a schematic, pictorial view of a partition between receptacles in the cage of FIG. 1.

Reference is now made to FIGS. 2A/B, 3, 4A-C and 7, which illustrate aspects of the attachment of bezel 26 to cage structure 24, in accordance with an embodiment of the present invention. FIGS. 2A and 2B are schematic exploded views of cage 20, seen from above and below, respectively, showing bezel 26 separated from cage structure 24. FIG. 3 is a schematic bottom view of cage 20, showing tab connections between cage structure 24 and bezel 26. FIGS. 4A, 4B and 4C are schematic detail views of the bottom of cage 20, illustrating successive stages in the connection of bezel 26 to cage structure 24. FIG. 7 is a schematic, pictorial view of a partition 60 between receptacles 22 in cage 20.

The lower side of bezel 26 has multiple slots 38, with adjacent indentations 40. Cage structure 24 comprises an upper side (covered by the heat sink structure in the figures) and a lower side 30, which is mounted against an underlying PCB, with pins 32 fitting into holes in the PCB as noted above. As shown in FIG. 2B, lower side 30 extends over only a part of the lower surface of the cage structure, leaving openings at the rear side of cage 20 for electrical connections between the internal electrical elements of receptacles 22 and corresponding traces on the PCB (not shown in the figures). The PCB typically comprises a ground plane below lower side 30, which is contacted by springs 34 at the rear edge of the lower side, as described below.

Multiple partitions 60 (best seen in FIG. 7) extend between the upper and lower sides of cage structure 24 to define receptacles 22 for receiving cable connectors. Partitions 60 are fixed in place by flanges 42, which fit through and then bend over corresponding slots in the upper and lower sides of the cage structure. In addition, a tab 36 at the lower side of the front of each partition 60 protrudes downward, through lower side 30, at a location at which the tab will fit into a corresponding slot 38 in the bezel. (Alternatively or additionally, similar slots and tabs may be formed at the top side of the bezel and the cage structure, but such tabs and slots are not used in the present implementation.)

As shown in FIGS. 4A-4C, to assemble bezel 26 onto cage structure 24, the bezel is fitted over the front of the cage structure so that tabs 36 slide into corresponding slots 38. Each tab is then folded over the corresponding slot into the adjacent indentation 40 in the bezel, thus securing the cage structure to the bezel.

Spring Contacts Between Cage and Connector Shells

Figure 5:
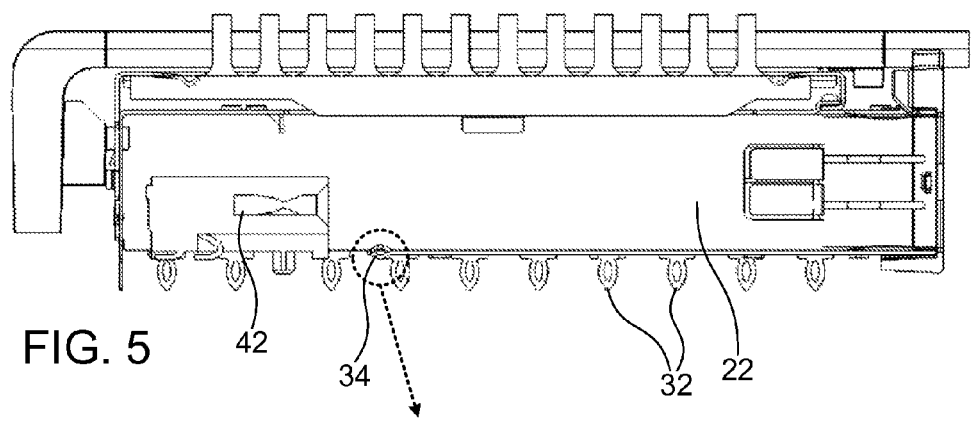
FIG. 5 is a schematic, sectional view of a receptacle within the cage of FIG. 1, cut in a vertical plane along the line V-V that is shown in FIG. 1.
Figure 6:
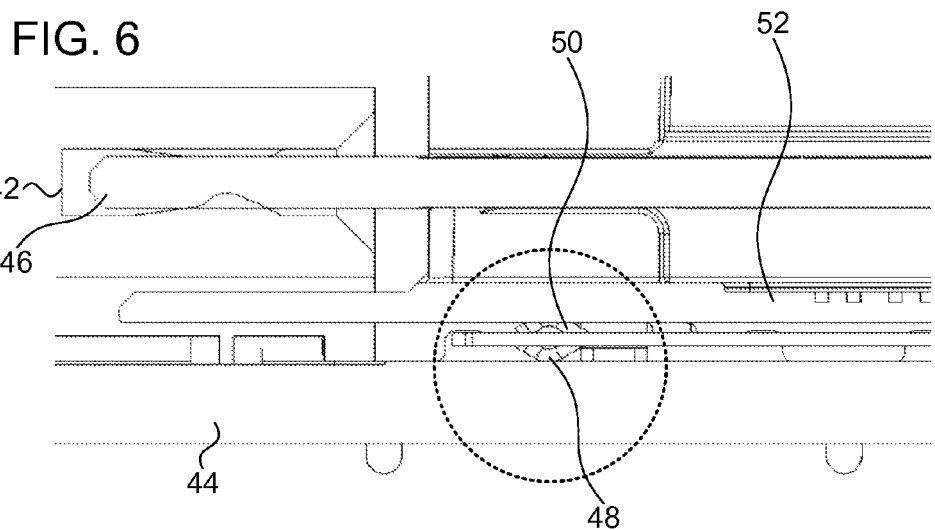
FIG. 6 is a schematic detail view of a contact spring at the bottom of the cage, making contact with the PCB on which the cage is mounted and with the shell of a connector that is inserted into the receptacle.

Reference is now made to FIGS. 5 and 6, which show details of the structure and operation of springs 34, in accordance with an embodiment of the present invention. FIG. 5 is a schematic, sectional view of one of receptacles 22 within cage 20, cut in a vertical plane along the line V-V that is shown in FIG. 1. FIG. 6 is a schematic detail view of a contact spring 34 at the bottom of cage 20, making contact with the PCB on which the cage is mounted and with the shell of a connector that is inserted into the receptacle. These figures also show certain features of the electrical components of receptacles 22 and of a cable connector that is inserted into one of the receptacles (FIG. 6). Specifically, receptacle 22 comprises an edge connector 42, which receives and makes contact with the forward edge of a miniature PCB 46 within the cable connector.

As noted earlier, and as seen best in FIG. 2B, the rear edge of lower side 30 of cage structure 24 is cut and formed to define multiple springs 34, including a set of these springs below each receptacle 22. As shown in FIG. 6, each spring 34 comprises upper leaves 50, which bend upward into receptacle 22 to engage a shell 52 of the connector that is inserted into the receptacle, and lower leaves 48, which bend downward to engage a PCB 44 on which cage 20 is mounted. Springs 34 thus ensure proper mechanical alignment of the connector in the receptacle. These springs also improve electrical contact between cage structure 24, connector shell 52 (which is typically made from metal), and the metal ground plane on PCB 44, thus providing secure ground connections and enhancing protection against electromagnetic interference (EMI).

FIGS. 8A and 8B are schematic detail views of partition 60, illustrating snap-on spring subassembly 28 attached to the front end of the partition, in accordance with another embodiment of the present invention. Each such spring subassembly is secured to the front end of a respective partition 60 and comprises leaves 64 that bow outward to contact the shells of the connectors that are inserted into the receptacles 22 that are adjacent to the partition. Partition 60 may also comprise its own spring tabs 62, which are punched and bent outwards into the adjacent receptacles. Spring subassemblies 28 snap easily and securely onto the partitions, and like springs 34, enhance alignment of the connectors and EMI protection.

Each spring subassembly 28 has a central fold 66, which fits over the front end of the respective partition 60. Leaves 64 are formed on the opposing sides of fold and thus bow outward into the receptacles on the opposing sides of the partition. The spring subassembly is secured to the partition by fastening elements, which extend rearward from leaves 64 on both sides of partition and which then mate through an opening 70 in the partition. One of these fastening elements may comprise, for example a plate 68 on one side of subassembly 28, which fits within opening 70 and contains a number of slots 74. The other fastening element in the pictured embodiment comprises one or more tabs 72 on the other side of subassembly 28, which fit into slots 74. After fitting fold 66 over the front end of partition 60, tabs are inserted through slots 74 and are then bent forward (as indicated by the arrow in FIG. 8B) to lock subassembly 28 in place.

Figure 9:
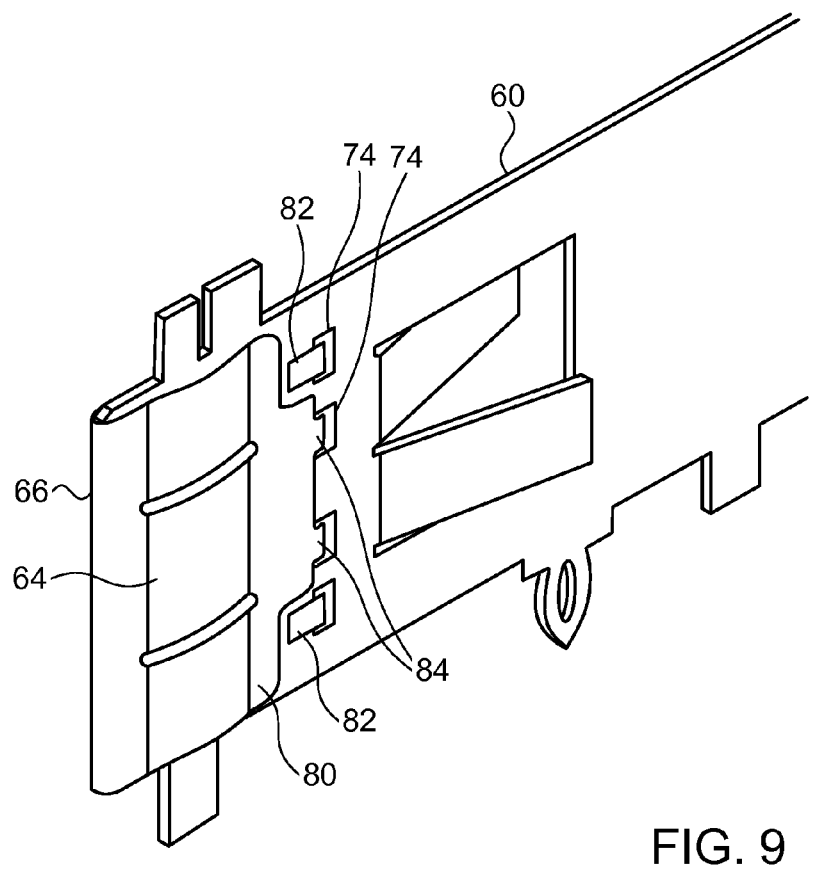
FIG. 9 is a schematic detail view of a snap-on spring subassembly attached to the front end of a partition, in accordance with another embodiment of the present invention.

FIG. 9 is a schematic detail view of a snap-on spring subassembly 80 attached to the front end of partition 60, in accordance with another embodiment of the present invention. Subassembly 80 can be substituted for subassembly 28 in cage 20 and has similar features. Therefore, elements of subassembly 80 that are similar in structure and function to those in subassembly 28 are marked in FIG. 9 with the same indicator numbers as in the preceding figures. In place of tabs 72, however, the fastening elements of subassembly 80 comprise two sets of tabs 82 and 84, and slots 74 are punched through partition 60 itself. Tabs 82 and 84 pass through slots 74 from respective opposing sides of partition 60 before being folded over to hold subassembly in place, as shown in FIG. 9. This design makes it possible to produce subassembly from thin material, such as stainless steel sheet 0.1 mm thick, thus taking up minimal space from receptacles 22. These spring subassemblies do not require any welding for assembly and are still capable of withstanding many cycles of connector insertion and removal without coming loose from the partitions.

FIG. 10 is a schematic, pictorial illustration showing two multi-receptacle cages 20a and 20b mounted "belly to belly," i.e., with the respective lower sides adjacent to one another, on a common PCB 82. The receptacles in both cages open out through a panel 90 of the equipment in which the cages are mounted. This configuration enables even higher port density to be achieved.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for production of a connector cage, comprising:
   providing a cage structure comprising upper and lower sides and multiple partitions extending between the upper and lower sides to define receptacles for receiving cable connectors; and
   connecting a bezel to the cage structure by fitting multiple tabs, which protrude out of at least one of the sides of the cage structure, into slots in the bezel, and folding the tabs over the slots.

2. The method according to claim 1, wherein the tabs are formed as a part of the partitions.

3. The method according to claim 1, wherein the bezel has indentations adjacent to the slots, such that the tabs fold into the indentations.

4. The method according to claim 1, wherein the lower side is configured to be mounted on a printed circuit board (PCB), and wherein the cage comprises multiple partitions extending between the upper and lower sides to define receptacles for receiving cable connectors having respective shells that fit into the receptacles,
   wherein an edge of the lower side is cut and formed to define multiple spring leaves, comprising first leaves that bend upward into the receptacles to engage the shells of the connectors and second leaves that bend downward to engage the PCB.

5. The method according to claim 1, and comprising attaching multiple snap-on spring subassemblies to the cage structure by securing each spring subassembly to a front end of a respective partition, the spring assemblies comprising leaves that bow outward to contact the shells of the connectors that are inserted into the receptacles adjacent to the partition.

6. The method according to claim 1, wherein the cable connectors have respective shells that fit into the receptacles, and the method comprises:
   cutting and forming an edge of the lower side to define multiple spring leaves, comprising first leaves that bend upward into the receptacles to engage the shells of the connectors and second leaves that bend downward to engage the PCB.

7. The method according to claim 6, and comprising attaching multiple snap-on spring subassemblies to the cage structure by securing each spring subassembly to a front end of a respective partition, the spring assemblies comprising leaves that bow outward to contact the shells of the connectors that are inserted into the receptacles adjacent to the partition.

8. The method according to claim 1, wherein the cable connectors have respective shells that fit into the receptacles, and the method comprises:
   snapping onto a front end of each partition a respective spring subassembly, which comprises leaves that bow outward to contact the shells of the connectors that are inserted into the receptacles adjacent to the partition.

9. The method according to claim 8, wherein each spring subassembly has a central fold, which fits over the front end of the respective partition, and comprises first and second leaves, disposed respectively on opposing, first and second sides of the fold so as to bow outward into the receptacles on the opposing sides of the respective partition, and
   wherein snapping the respective spring subassembly onto each partition comprises passing fastening elements, which extend rearward from the leaves, through an opening in the partition, and folding the fastening elements over through the opening so as to secure the spring subassembly to the partition.

10. The method according to claim 9, wherein the fastening elements comprise tabs extending rearward from the first leaves, and wherein the spring subassembly comprises a plate, which extends rearward from the second leaves and which contains one or more slots and fits within the opening in the partition, and wherein the tabs fit into the slots in the plate and are folded over the plate to secure the spring subassembly to the partition.

* * * * *